(12) United States Patent
Timmins (10) Patent No.: US 9,101,862 B2
(45) Date of Patent: Aug. 11, 2015

(54) FILTERING MACHINE

(76) Inventor: John Andrew Timmins, Wolverhampton (GB)

( * ) Notice: Subject to any disclaimer, the term of this patent is extended or adjusted under 35 U.S.C. 154(b) by 311 days.

(21) Appl. No.: 13/636,761

(22) PCT Filed: Jun. 3, 2010

(86) PCT No.: PCT/GB2010/050933
§ 371 (c)(1),
(2), (4) Date: Nov. 28, 2012

(87) PCT Pub. No.: WO2011/121264
PCT Pub. Date: Oct. 6, 2011

(65) Prior Publication Data
US 2013/0068686 A1 Mar. 21, 2013

(30) Foreign Application Priority Data
Apr. 1, 2010 (GB) .................................. 1005535.8

(51) Int. Cl.
| *B01D 39/20* | (2006.01) |
| *B01D 39/14* | (2006.01) |
| *B01D 17/02* | (2006.01) |
| *B01D 17/00* | (2006.01) |
| *B01D 39/06* | (2006.01) |

(52) U.S. Cl.
CPC ........ *B01D 39/2017* (2013.01); *B01D 17/0202* (2013.01); *B01D 17/10* (2013.01); *B01D 39/06* (2013.01); *B01D 39/14* (2013.01); *B01D 2239/0407* (2013.01); *B01D 2239/0428* (2013.01); *B01D 2239/1225* (2013.01); *B01D 2239/1233* (2013.01); *Y10T 29/49826* (2015.01)

(58) Field of Classification Search
CPC .... B01D 17/0202; B01D 17/10; B01D 39/06; B01D 39/2017; B01D 39/14; B01D 2239/0407; B01D 2239/1225; B01D 2239/1233; B01D 2239/0428
See application file for complete search history.

(56) References Cited

U.S. PATENT DOCUMENTS

| 4,168,229 A | | 9/1979 | Chambers |
| 4,240,908 A | | 12/1980 | Rutz et al. |
| 4,309,289 A | | 1/1982 | Head |
| 4,753,730 A | | 6/1988 | Maurer |
| 5,196,123 A | * | 3/1993 | Guthy ........................... 210/663 |
| 5,215,407 A | * | 6/1993 | Brelsford ........................ 405/63 |
| 5,252,215 A | * | 10/1993 | McFarlane et al. ........... 210/691 |

(Continued)

FOREIGN PATENT DOCUMENTS

| EP | 0 366 947 | 5/1990 |
| WO | WO 00/74809 | 12/2000 |

OTHER PUBLICATIONS

International Search Report for PCT/GB2010/050933, mailed Dec. 14, 2010.

(Continued)

*Primary Examiner* — Matthew O Savage
(74) *Attorney, Agent, or Firm* — Lathrop & Gage LLP (57) ABSTRACT

A filtering machine (10) for filtering a mixture which includes entrained oily contaminant, the filtering machine (10) including a filter (14) which has an exterior housing (15) through which the mixture, in use, passes to contact filter material within the interior of the filter housing (15), and through which filtrate passes out of the filter (14), and wherein the filter material includes particles (29) of agglomerated oleophillic fibers.

34 Claims, 2 Drawing Sheets

(56) References Cited

U.S. PATENT DOCUMENTS

| | | |
|---|---|---|
| 5,705,076 A | 1/1998 | Brinkley |
| 5,928,588 A | 7/1999 | Chen et al. |
| 2006/0096263 A1 | 5/2006 | Kahlbaugh |
| 2006/0157397 A1 | 7/2006 | Yokota |

OTHER PUBLICATIONS

Written Opinion of the International Searching Authority for PCT/GB2010/050933, dated Dec. 14, 2010 (see form PCT/ISA/210).

* cited by examiner

FILTERING MACHINE

CROSS-REFERENCE TO RELATED APPLICATIONS

This application is a U.S. National Stage Application under 35 U.S.C. §371 of International Application No. PCT/GB2010/050933, filed Jun. 3, 2010, which claims the benefit of British Patent Application No. GB 1005535.8, filed Apr. 1, 2010, each of which is hereby incorporated by reference in its entirety.

DESCRIPTION OF INVENTION

This invention relates to a filtering machine for filtering a mixture which includes entrained oily contaminant. For example the filtering machine may filter condensate from an air compressor, which typically is predominantly water, with some entrained impurities, specifically oil.

It is known to remove the oily contaminant from condensate using filter material, typically by filtering the condensate though activated Carbon material. This is very efficient at removing the oil, but is expensive, and the Carbon can quickly become contaminated where the condensate contains large amounts of oil.

It is known from, for example, U.S. Pat. No. 4,753,730 to use fine fibres of polypropylene as a filter material. Although the use of fine fibres such as those suggested on U.S. Pat. No. 4,753,730 maximises the available surface area for contacting the liquid to be filtered, a problem with such fine fibres is that they matt when subjected to heavy fluid flows or when immersed in the liquid to be filtered. Such matted fibres reduce the flow of liquid though the filter material. Accordingly such filter material cannot be densely packed into a filter housing as this aggravates the restricting of fluid flow.

In U.S. Pat. No. 4,753,730 matted fibres are cut into strands in an effort to improve liquid flow though the material.

Even after prolonged use of such filter material in this form, even if immersed in the liquid to be filtered, much of the matted fine fibres will tend to remain dry and uncontacted by the mixture as the mixture to be filtered flows though flow paths of least resistance in the matted fibres.

To improve filtering efficiency and aid flow it is desirable to wet the fine fibre material. However typical wetting agents if used in conjunction with polypropylene fibres, have a deleterious effect, as detergent or other surfactant for example reduces the polypropylene's ability to discriminate between for example, oil and water, with the effect that the filter material adsorbs both oil and water, reducing filtering efficiency.

As at least some of the oil in the condensate separates from the water and floats in or on the water, it has been proposed to pre-filter the condensate before final filtering through activated Carbon, for example using the proposal of EP-A-1185347 in which a filter including ribbons of oleophillic material is used.

According to a first aspect of the invention I provide a filtering machine for filtering a mixture which includes entrained oily contaminant, the filtering machine including a filter which has an exterior housing through which the mixture, in use, passes to contact filter material within the interior of the filter housing, and through which filtrate passes out of the filter, and wherein the filter material includes particles of agglomerated oleophillic fibres.

It has been found that using particles of agglomerated oleophillic fibres provides for more efficient filtering of the mixture than can be achieved using a filter material such as oleophillic fibres or strands. Whereas oleophillic fibres (and strands) can become compacted when subject to large or prolonged flows, particles of agglomerated oleophillic fibres are not so compactable, and by virtue of being particles, the filter material is provided with clear flow paths in interstitial spaces between the particles.

The oleophillic fibres of the particles of agglomerated oleophillic fibres are preferably silica-based fibres, such as glass fibres in the form of wool, which may for example include very fine fibres.

It has been found surprisingly that using silica-based fibres, and particularly but not exclusively glass fibres in the form of glass wool, agglomerated into particles, is very efficient at filtering oily contaminant from water. It has been found that silica-based fibres can be treated with a wetting agent, such as a detergent or other surfactant without the silica-based fibres losing their ability to discriminate between oily contaminant and water.

According more oily contaminant may be adsorbed whilst more filtrate from the mixture is permitted to flow through the filter material, the agglomerated fibres "wicking" the oily contaminant into the particles. Because the wetted silica-based agglomerated fibres are so much more efficient at filtering than e.g. polypropylene, it is possible to pack the agglomerated silica-based fibre particles to a higher density in the exterior housing. Thus the invention achieves more efficient oily contaminant and water separation, whilst resistance to flow through the filter material is minimised.

Preferably the oleophillic fibres from which the particles are agglomerated have a diameter of less than 10 µm, and preferably less than 8 µm, for example, in the range 5.0 µm to 5.5 µm. Preferably the fibres are short, by which we mean that predominantly the fibres are less than 20 mm in length.

The particles of agglomerated glass fibres may be packed in the exterior housing at a density of between 80 grams per liter and 200 grams per liter, preferably in the order of 140 grams per liter, and in the generality of between 50 grams per liter and 400 grams per liter.

Oleophillic fibres other than silica-based fibres may be used, such as for example polypropylene fibres for the agglomerated particles, although these may demand less dense packing and may be less efficient at filtering.

Preferably predominantly the particles of agglomerated oleophillic fibres particularly but not exclusively glass fibres, have a maximum external dimension in the range 1 mm to 7 mm and preferably in the range 1 mm to 5 mm. The particles of other agglomerated oleophillic fibres may though be of other sizes, for example between 1 mm and 20 mm.

The agglomeration process typically will form ball-like particles which are generally spherical and thus the maximum external dimension will be the external diameters of the particles.

Although the filter material may include solely the particles of agglomerated oleophillic fibres, if desired the filter material may incorporate other constituents, such as other fibres which may or may not be oleophillic, as required, to improve filter efficiency. The filter material may incorporate an oleophillic adsorbent. For example the oleophillic adsorbent may be in powder form, and may at least partially coat at least some of the particles of agglomerated oleophillic fibres. However, the particles of agglomerated oleophillic fibres may include such adsorbent, depending on when and how the adsorbent is introduced in the manufacturing process. In some circumstances the use of such oleophillic adsorbent may yet further improve the efficiency of the filtering machine.

The powder particles of oleophillic adsorbent may be smaller than the particles of agglomerated oleophillic fibres so as to be able to coat the particles of agglomerated oleophillic fibres, and for example, the powder particles of oleophillic absorbent may be able to pass through a sieve of mesh size 200, this having a maximum dimension in the order of 74 µm.

The particles of oleophillic adsorbent may include at least one of clay, Bentonite clay, Organoclay, and activated Carbon.

Where the oleophillic adsorbent is used in powder form to coat the particles of agglomerated oleophillic fibres, the powder can become shaken from the particles, especially during transport of the filter from where it was manufactured to where the filter is used. In use, especially once the particles of agglomerated oleophillic fibres are wet, the powder is less inclined to become separated from the particles.

If required, during agglomeration of the oleophillic fibres to manufacture the particles of the agglomerated oleophillic fibres, the particles may be coated at least partially with an adhesive agent, such as glycerine, which promotes adhesion of the adsorbent powder to the particles of agglomerated oleophillic fibres, at least during transport. In use, the glycerine may be washed from the particles by the flowing mixture being filtered.

Although an alternative adhesive agent to glycerine could be used, glycerine has little or no environmental impact and may be discharged from the filtering machine along with the filtered water.

The filter may include within the filter housing, particles of an anti-packing material which does not adsorb oily contaminant, which may be mixed with the particles of agglomerated oleophillic fibres. For example Perlite particles of a size corresponding to the size of the particles of agglomerated oleophillic fibres may be used. Such anti-packing particles may assist in maintaining flow paths through the filter material for the mixture being filtered, especially when the particles of agglomerated oleophillic fibres have adsorbed significant quantities of the oily contaminant.

Even though the particles of agglomerated oleophillic e.g. silica-based, preferably glass wool fibres of the filter provide a considerable improvement over other filter materials such as polypropylene used in the context of filtering condensate from air compressors, particularly when the filter is new and the particles of agglomerated oleophillic fibres are first exposed to the condensate, the filter may not be as efficient at filtering as it may become in due time as the particles of agglomerated oleophillic fibres become wetted.

It has been found surprisingly that prior to use, treating the particles of at least oleophillic fibres, where the fibres are silica-based fibres, with a wetting agent such as a detergent or other surfactant, does not seriously detrimentally affect the particles' ability to discriminate between water and oily contaminant i.e. such treatment results in the more efficient adsorption of the oily contaminant by the particles of agglomerated fibres, whilst the fibres become fully wetted.

Any wetting agent such as a detergent used is flushed away as the filter is used, and so desirably the wetting agent used has a low environmental impact.

The exterior housing of the filter may be provided at least in part, by a flexible material e.g. a woven or non-woven material, and/or at least in part in a more rigid material such as a rigid or semi-rigid material.

The filtering machine may include a main filter chamber in which the filter is located, there being an inlet to the chamber for the mixture, and an outlet from the chamber for filtrate, the mixture passing in use, from the inlet to the chamber, through the exterior housing wall of the filter into the interior of the filter, and filtrate may pass back through the exterior housing wall of the filter to the main filter chamber outlet.

The exterior housing of the filter may have openings which permit the mixture and filtrate to flow to and from the interior of the filter which are provided by the construction of the exterior housing. For example the exterior housing may be made of a material which has openings formed by perforating the material. Where the housing material is in the nature of a cloth, the openings may be provided by needle punching.

Preferably the openings which permit mixture and filtrate liquid flow are smaller or at least not substantially larger than the particles of oleophillic adsorbent, which themselves are preferably an order of magnitude smaller than the particles of agglomerated oleophillic fibres.

The filter may include an external seal which seals with an interior wall of the main chamber, so that mixture which passes into the main filter chamber through the inlet is constrained to pass into the filter interior before being able to pass to the main filter chamber outlet.

The main filter chamber may include at or towards an upper end thereof, a removable lid, which when closed with the remainder of the chamber, seals or substantially seals the main filter chamber, and when opened permits removal and replacement of the filter from the main filter chamber.

The filter may be an air-phase filter i.e. with the mixture to be filtered in use trickling though the filter material of the filter, or the filter may be a wet-phase filter wherein the filter is in use, at least partially immersed in at least one of the mixture and the filtrate.

Particularly but not exclusively where the filter is a wet-phase filter, the filtering machine may include a secondary filter chamber which receives filtrate from the main filter chamber, the secondary filter chamber including a further filter. The further filter may be of similar construction to the filter in the main filter chamber, or may be of an alternative construction. For example the further filter may include filter material which is Carbon, or a mixture of Carbon and/or if desired, another filter material such as particles of agglomerated oleophillic fibres.

According to a second aspect of the invention I provide a filter for a filtering machine of the first aspect of the invention.

According to a third aspect of the invention I provide a method of filtering using a filtering machine of the first aspect of the invention, the method including passing mixture into the filter interior, and contacting the mixture with the filter material in the interior of the filter, and passing the filtrate out of the filter.

The filtering method may include wetting the filter material prior to filtering, using a wetting agent. In use, the filter may be at least partially immersed in at least one of the mixture to be filtered and the filtrate. Suitable wetting agents may be a detergent or other surfactant, preferably which, when passing from the filtering machine with the filtrate, do not have an adverse effect on the environment.

According to a fourth aspect of the invention I provide a method of making a filter which includes an exterior housing through which a mixture which includes entrained oily contaminant, in use, passes to contact filter material within an interior of the filter housing, and through which filtrate passes out of the filter, the method including making the filter material by introducing oleophillic fibres into an agglomerating device which agitates the oleophillic fibres and forms the fibres into particles of agglomerated oleophillic fibres, and introducing the particles of agglomerated oleophillic fibres into the filter housing.

The method may include introducing into the agglomerating device, before, with or after introducing the oleophillic fibres to be agglomerated, powder particles of an oleophillic adsorbent at least partially to coat at least some of the particles of agglomerated oleophillic fibres.

Examples of suitable particles of oleophillic adsorbent include at least one of clay, Bentonite clay, Organoclay, and activated Carbon.

The method may include prior to introducing the powder particles of oleophillic adsorbent, introducing an adhesive agent to promote adhesion of the powder to the particles of agglomerated oleophillic fibres.

The method may include treating the particles of agglomerated oleophillic fibres with a wetting agent prior to placing the particles in the filter housing.

Embodiments of the invention will now be described with reference to the accompanying drawings in which:—

Figure 1:
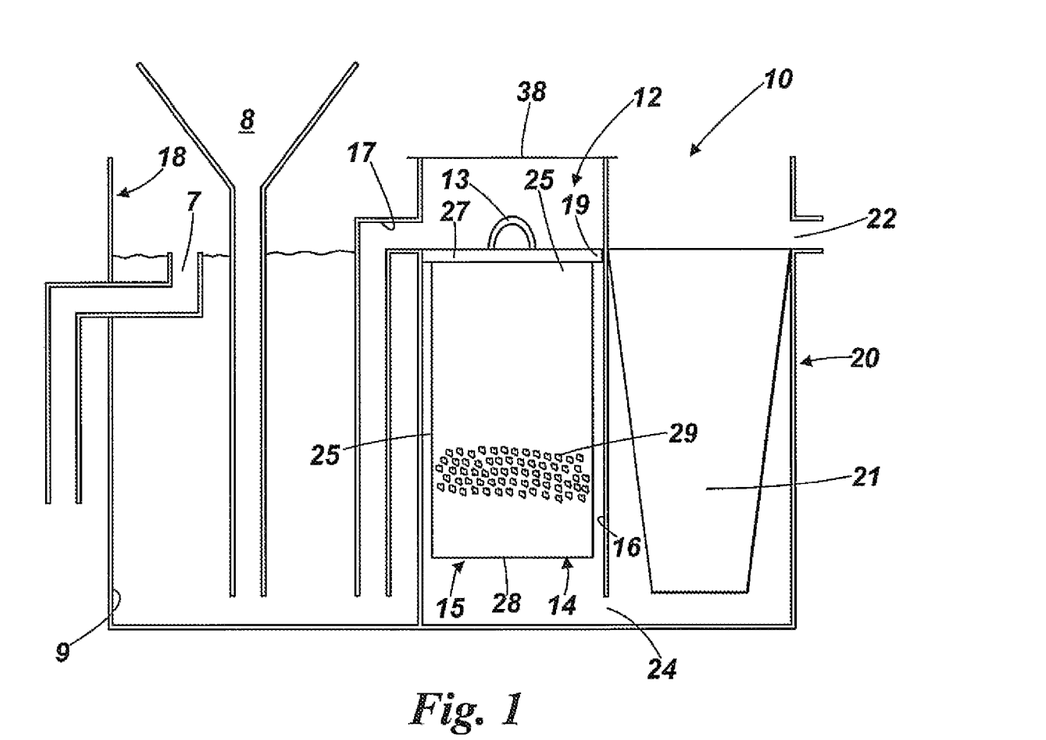
FIG. 1 is an illustrative view of a filtering machine in accordance with the invention.
Figure 2:
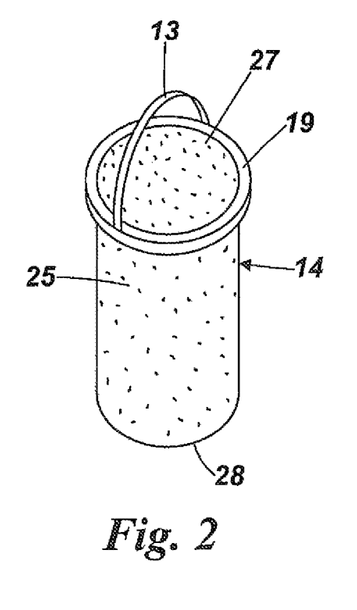
FIG. 2 is a perspective illustrative view of the filter of the machine of FIG. 1 without filter material.
Figure 3:
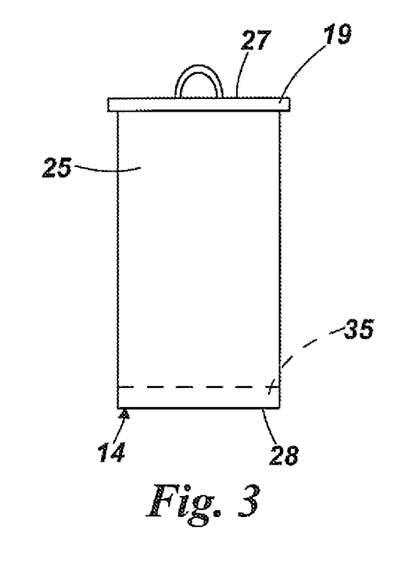
FIG. 3 is an illustrative sectional side view of the filter of FIG. 2, again without further material.

Referring to FIGS. 1 to 3 of the drawings, a filtering machine 10 is shown which in the example is specifically for filtering a mixture of water and entrained oily contaminant being condensate from at least one air compressor. However the machine 10, or a modified machine may be used to filter other mixtures which include entrained oily contaminant.

The filtering machine 10 has a main filter chamber 12 in which a filter 14 is provided. In the example the main filter chamber 12 is substantially cylindrical, and the filter 14 is of a corresponding configuration but the filter chamber 12 and/or the filter 14 could be of another configuration as required. The filter 14 includes an external housing 15, and at one axial end, i.e. the upper end of the filter 14, the filter 14 includes an external seal 19 which when the filter 14 is received in the chamber 12, provides a seal with an internal wall 16 of the main filter chamber 12.

The filtering machine 10 further includes an inlet 17 to the main filter chamber 12 through which condensate to be filtered enters the chamber 12 at a position located above the filter 14 in this example.

The inlet 17 in this example receives condensate from beneath a weir device 18. Condensate from one or more air compressors, cooling plants etc. which includes entrained oily contaminant is collected in an ante-chamber 9 of the weir device 18 to which it flows though a machine inlet 8. As the liquid collects in the ante-chamber 9, there will be some separation between the water component of the condensate and the oily contaminant, although some water will remain emulsified with the oily contaminant. When the liquid level in the ante-chamber 9 rises to that of an outlet weir 7, lighter floating oily contaminant (and such contaminant emulsified with water) will pass over the weir 7 and pass to a collector (not shown) for disposal.

Condensate which does not pass from the weir device 18 over the weir 7, i.e. which is the predominantly water faction, passes upwardly from a lower region of the ante-chamber 9 in a feed pipe, to the inlet 17 to the main filter chamber 12, which is at the same height as the weir 7.

Condensate which enters the main filter chamber 12 via the inlet 17 is constrained to pass through the filter 14 where it is filtered, and then filtrate passes to a main filter chamber outlet 24 below the filter 14 in this example. The filtrate then passes in this example into a secondary filter chamber 20, where it flows through a Carbon filter 21, and from the Carbon filter 21 to a machine discharge outlet 22 which in this example is at the same level as the weir 7, but could be at a lower level.

By filtering the condensate in the main filter chamber 12 and then filtering the filtrate from the main filter chamber 12 again as required, in the secondary filter chamber 20, the liquid which is discharged at 22 is substantially cleansed of oily contaminant, and the object is for it to be sufficiently clean that the filtered liquid can be discharged safely to the environment.

The exterior housing 15 of the filter 14 in the main filter chamber 12 defines internally, a filter interior. The housing 15 in this example has either a cloth, woven, non-woven or the like generally flexible cylindrical side wall 25, and substantially rigid upper and low end walls 27, 28 respectively. The upper and lower end walls 27, 28 have openings provided by perforations (or the openings may be integrally formed with the upper and/or lower end walls 27, 28 material), and the flexible side wall 25 is provided with openings by perforating by needle punching e.g. during manufacturing of the cloth. In another example an alternative part of the entire exterior housing 15 may be rigid, semi-rigid or flexible, or the side wall 25 may be rigid and one or both of the end walls 27, 28 flexible. In each case the openings in the exterior housing 15 in at least the upper end wall 27, provide passages through which condensate may pass into the filter interior, and the openings in the side wall 25 and the lower end wall 28, at least below the seal 19, provide passages through which filtrate can pass back out of the filter interior.

Of course, depending on where and how the seal 19 is provided, if at all, the condensate entering the main filter chamber 12 is separated from the filtrate, and so different openings to those identified may allow for the passage of condensate/filtrate into and back out of the filter interior. For example, if the seal 19 was provided axially part-way along the side wall, 25, the openings in the side wall 25 above the seal would allow condensate to pass into the filter interior, and openings in the side wall 25 below the seal 19 would permit the filtrate to pass back out of the filter interior.

Within the filter interior there is provided filter material, which according to the invention includes particles 29 of agglomerated oleophillic fibres, such as silica-based fibres, typically glass fibres in the form of glass wool. In FIG. 1, only some of the particles 29 which fill the entire or substantially the entire interior of the filter housing 15 are illustrated.

Glass fibres are naturally oleophillic and it has been found that providing the filter material in the form of particles 29 of agglomerated oleophillic fibres, such as glass fibres, results in particularly efficient filtering of a mixture with entrained oily contaminant.

The particles 29 may in another example be agglomerated from a mixture of different kinds of oleophillic fibres, for example only a blend of glass and polypropylene fibres, or may be entirely of another kind of oleophillic fibre, such as polypropylene.

In each case, the particles of agglomerated oleophillic fibres are not easily compactable by the flowing mixture/filtrate, and by virtue of being particles, the filter material is provided with clear flow paths in the interstitial spaces between the particles 29, so that the filter 14 does not provide significant restriction to fluid flows. However the fluid flow rate through the filter 14 can to an extent be controlled by varying the packing density of the particles 29 in the filter housing 15.

In one example, particles 29 of agglomerated glass fibres filter material may be packed in the exterior housing 15 to a density of between 80 grams per liter and 200 grams per liter and preferably in the order of 140 grams per liter. Thus the mass of filter material provides a substantial flow volume made up of the interstitial spaces between the particles 29 so as not substantially to obstruct the flow of fluid through the filter material, at least prior to adsorption of a significant quantity of the oily contaminant.

Particularly for a filtering machine for filtering condensate, where the filter material is preferably predominantly particles of agglomerated glass wool fibres, the particles may have a maximum external dimension in the range 1 mm to 7 mm and more preferably in the range of 1 mm to 5 mm. The particles may be larger, for example in the range 1 mm to 20 mm diameter, as required.

For particles of other oleophillic fibres which may be less adsorbent of the oily contaminant, the particles may demand to be packed less densely than for particles of agglomerated glass fibres so that the interstitial spaces between the particles do not become clogged with oily contaminant.

In another example, if desired, particulate anti-packing material such as Perlite may be mixed with the particles of agglomerated oleophillic fibres. The Perlite or other particles may not adsorb any significant quantity of oily contaminant, if any, but act to maintain the interstitial spaces and hence the flow paths for mixture being filtered, as the particles of agglomerated oleophillic fibres adsorb the oily contaminant.

Figure 5:
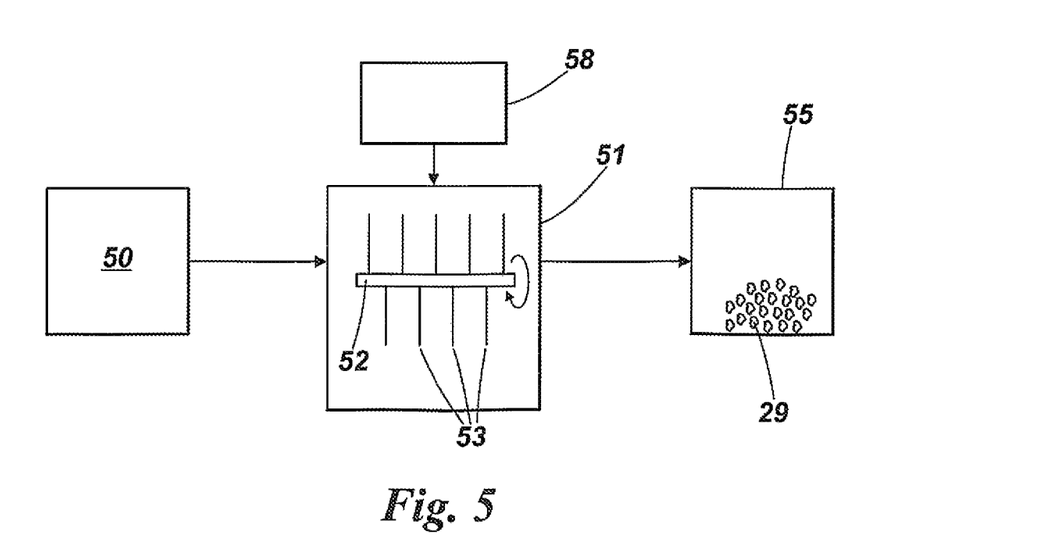
FIG. 5 is a diagram illustrating the steps and apparatus for agglomerating glass fibres into particles.

Referring now to FIG. 5 there are illustrated the steps in a process and apparatus for agglomerating glass wool fibres into particles 29, which may be used for agglomerating other oleophillic fibres into particles.

Glass fibres, preferably in the form of glass wool which may for example include fine fibres having a diameter in the order 5.0 μm to 5.5 μm and a length of less than 20 mm are introduced from a store 50 into an agglomerating device 51 which in the example is of the kind including a generally horizontal shaft 52 which carries a plurality of radially outwardly extending agitating blades 53. The shaft 52 is continuously rotated, desirably for a period in one direction, and then in an opposite direction, while the blades 53 agitate and act on the glass fibres in the agglomerating device 51. Gradually the glass wool fibres are agglomerated, initially into light and fluffy generally spherical particles, and as agitating continues, into more compact and less fluffy particles.

The agglomeration process typically will form ball-like particles 29 which are generally spherical and the maximum external dimension of 1 mm to 20 mm, which, as mentioned above will be the external diameters of the particles 29, or especially for glass wool fibres, the particles 29 may have diameters in the range 1 mm to 7 mm and more desirably between 1 mm and 5 mm.

After a suitable time, which may be in excess of an hour, the particles 29 are removed from the agglomerating device 51 and either placed in a store 55, or fed directly into the interior of a filter housing 15.

The particular kind of agglomerating device 51 which has been used in experiments is a Winkworth RT mixer of the kind which is generally industrially used for mixing granules, powders, slurries, pastes, and doughs. Another kind of agglomerating device 51 may be used which is able to act on glass or other oleophillic fibres to agglomerate the oleophillic fibres into particles 29.

Desirably the particles 29 of agglomerated oleophillic fibres, especially glass fibres, are packed in the filter housing 15 to a density of between 80 grams per liter and 200 grams per liter e.g. about 140 grams per liter, and in the generality, to a packed density of between 50 grams per liter and 400 grams per liter.

Although the filter material in the filter housing 15 may include solely the particles 29 of agglomerated glass and/or other oleophillic fibres, if desired the filter material 29 may incorporate particles of an oleophillic adsorbent. For example the particles of oleophillic adsorbent may at least partially coat at least some of the particles 29 of agglomerated oleophillic fibres. In some circumstances such oleophillic adsorbent may yet further improve the efficiency of the filtering machine 10.

Referring again to FIG. 5, there is illustrated a store 58 for powdered oleophillic adsorbent, in this example such an adsorbent is known as Organoclay powder. The Organoclay power preferably has particles which are smaller than the particles 29 of agglomerated glass fibres, and desirably are powder particles. The power particles of the adsorbent are all able to pass through a mesh size 200.

The Organoclay powder particles from the store 58 may be introduced into the agglomerating device 51 e.g. during the course of the agglomeration process i.e. when at least some particles 29 of agglomerated oleophillic fibres have been at least partially formed. However the Organoclay powder particles could be introduced into the agglomerating device 51 additionally or instead, at an earlier and/or later juncture, or in another method, at least some Organoclay may be mixed with the particles 29 of agglomerated oleophillic fibres in a separate method step to the agglomeration process of the agglomeration device 51, e.g. in a previous or subsequent mixing device.

In each case preferably the Organoclay powder particles at least partially coat, but may instead or also, be captured within, the particles 29 of agglomerated oleophillic fibres, as the particles 29 are formed.

In another example, the oleophillic adsorbent may be another type of clay to Organoclay, for example Bentonite clay, or different particles altogether such as Carbon, or the oleophillic adsorbent may be a mixture of any of these, or any other suitable, preferably particulate, oleophillic adsorbent material.

In each case, the particles 29 of agglomerated glass fibres exhibit a particular affinity for oil, and thus as the condensate contacts, e.g. passes though, the filter material, predominantly the oily contaminant is adsorbed by the particles 29 of agglomerated glass fibres, and the water component is allowed to pass.

Using such particles 29 of agglomerated glass fibres has achieved particularly efficient filtering of the condensate as the particles 29 collectively present a large surface area to the condensate.

Because the agglomerated oleophillic fibres are particulate, there will be interstitial space between the particles.

In use as the particles of agglomerated oleophillic fibres are exposed to the mixture to be filtered, the mixture will flow through the filter material primarily thought flow paths established via the interstitial spaces between the particles, with the oily contaminant being "wicked" by the particles from the flowing mixture, into the particles.

As oily contaminant is adsorbed, the flow paths may become restricted, and so if desired, the filter material may include other particulate material, such as Perlite for an example, which does not adsorb any substantial amount of oily contaminant, if any. By being mixed with the particles of agglomerated oleophillic fibres, the Perlite or other additional particles maintains some separation between the particles of agglomerated oleophillic fibres and thus maintains flow paths through the filter material, even as oily contaminant is adsorbed by the particles of agglomerated oleophillic fibres.

The particles of Perlite or other additional particles may have dimensions corresponding to the dimensions of the particles of agglomerated oleophillic fibres namely between 1 mm and 7 mm diameter where the particles of agglomerated oleophillic fibres are of this size, or in the generality between 1 mm and 20 mm, depending on the nature of the particles of agglomerated oleophillic fibres.

At least in the embodiment illustrated in FIGS. 1 to 3, the openings in the side wall 25 and the upper and lower end walls 27, 28 of the exterior housing 15 which permit condensate/filtrate flow are all smaller or at least not substantially larger than the powder particles of the oleophillic adsorbent material. This is to deter the migration of the particulate oleophillic adsorbent material from the filter 14 through the openings in the event that such particles become released from the particles 29 of agglomerated oleophillic fibres they are coating. In any event the filter material of the filter 14 may include some particles of oleophillic adsorbent material which does not coat any particles 29 of agglomerated oleophillic fibres.

In another example, at least the lower end of the housing wall 28 may be lined with an inner lining which covers the openings in the lower end wall 28. Such a lining is indicated in dotted lines in FIG. 3 at 35. The lining 35 may be of a felt-like material, and so fluid flow passages in the felt material will be very small at least smaller than the openings in the lower end wall 28. This lining 35 will provide a further guard to deter any particulate material, i.e. (small) particles 29 of agglomerated glass fibres or particles of oleophillic adsorbent material where provided, being washed from the filter 14 through the openings in the lower end wall 28.

In the generality, the exterior housing 15 of the filter 14, or any part of it, may include over at least a part of its extent, multiple layers, including an outer housing layer with openings, and an inner or outer lining layer such as the felt-like material layer 35, with passages smaller than the openings in the outer housing layer 15.

Figure 4:
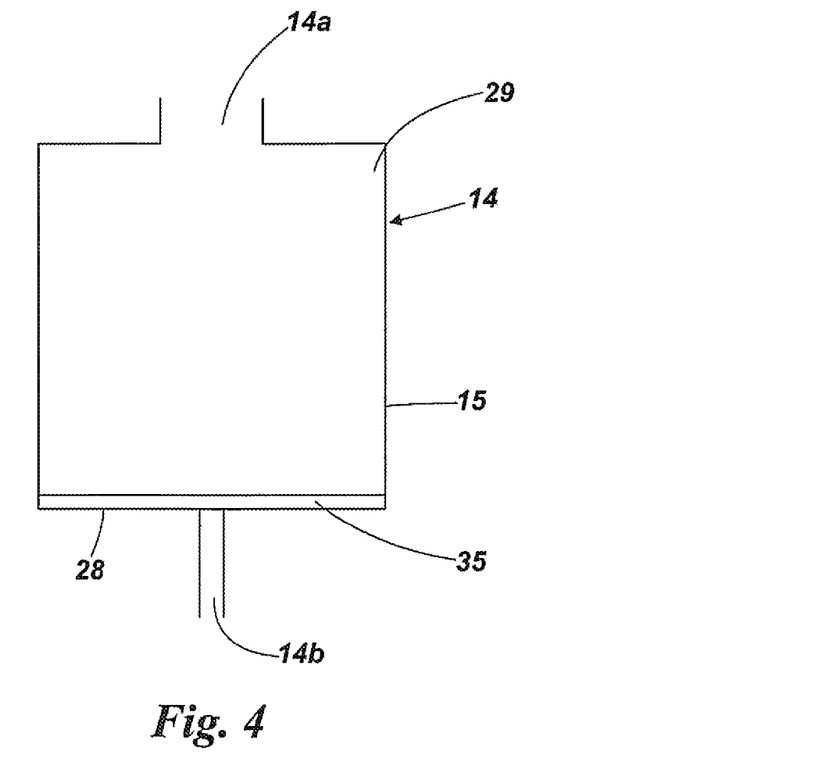
FIG. 4 is an illustrative view of a filter of another embodiment.

In the FIG. 4 embodiment, the filter 14 has an exterior housing 15 of rigid or semi-rigid material which is liquid-tight. The filter 14 though has an inlet at one end, indicated at 14*a* for receiving condensate, and an outlet 14*b* at an opposite end for filtered liquid. The filter 14 does not need to be accommodated in a filter chamber as with the previous embodiments. The filter 14 does not require a seal 19. There may be provided a lining 35 to prevent the migration of particles from the filter interior, though the outlet 14*b*.

Notwithstanding that the filter housing 15 may be designed to retain the oleophillic adsorbent, where the adsorbent is in powder form and coats the particles of agglomerated oleophillic fibres, the powder can become shaken from the particles, especially during transport of the filter 14 from where it was manufactured to where the filter 14 is used. In use, especially once the particles of agglomerated oleophillic fibres are wet, the powder of the adsorbent is less inclined to become separated from the particles.

If required, during agglomeration of the oleophillic fibres to manufacture the particles of the agglomerated oleophillic fibres or subsequently, the particles 29 may be coated with an adhesive agent, such as glycerine, which promotes adhesion of the adsorbent powder to the particles of agglomerated oleophillic fibres, at least during transport. In use, the glycerine may be washed from the particles in use by the flowing mixture being filtered.

Although an alternative adhesive to glycerine could be used, glycerine has little or no environmental impact and may be discharged from the filter machine along with the filtered water.

In the example illustrated with reference to FIGS. 1 to 3, the filter 14 is a wet-phase filter 14 in that the filter 14 is at least partially immersed in filtrate in the example, depending on the position of the seal 19.

The FIG. 4 embodiment may be used as a dry-phase filter 14 by trickling the mixture to be filtered through the filter 14.

To promote operation of the filter material 29 at least when the filter 14 is new, if desired the filter material 29 may be wetted by a wetting agent such as a detergent or other surfactant which may be introduced e.g. into the agglomerating device 51.

Thus the particles 29 of agglomerated oleophillic fibres, or the fibres prior to agglomeration, may be treated with the wetting agent, so that when the filter 14 is first used, more of the particles of agglomerated oleophillic fibres will wet and the filter 14 may be fully effective from the start, at filtering.

If desired, instead of thus treating the particles 29 of agglomerated fibres, or the fibres, before and/or during the agglomeration process, the particles 29 may be thus treated whilst being packed into the filter housing 15, or even subsequently, as is convenient.

In each case during use of the filter 14, the flowing mixture being filtered will wash away the detergent or other surfactant used as a wetting agent, which will pass from the filter machine 10 along with the filtrate, and/or some of the wetting agent may be adsorbed by the downstream Carbon filter 21 where provided.

The inclusion in the filter material of oleophillic material such as Organoclay further assists the filter to perform efficient filtering from new, as such adsorbent is so oleophillic.

When using some oleophillic fibres for agglomerating, which are self-wetting, such wetting agent may not be needed. Indeed some oleophillic materials, such as polypropylene cannot be wetted, at least with conventional wetting agents such as detergent, because otherwise the oleophillic material loses its ability to discriminate between oily contaminant and water in the mixture to be filtered, with the result that both these components become adsorbed by the particles. However silica-based fibres, and at least glass fibres, can be treated with such wetting agents without losing their ability to discriminate between the oily contaminant and water.

Various further modifications may be made without departing from the scope of the invention.

Another filtering machine in accordance with the invention need not have a weir device 18 to collect condensate or other mixture to be filtered, but condensate may directly enter the main filter chamber 12 via an inlet 17 where a chamber 12 is provided, or directly into the filter via the inlet 14*a* as in the FIG. 4 embodiment.

In the example of the FIGS. 1 to 3 embodiments, the main filter chamber 12 includes at an upper end thereof a lid 38 which when closed as shown, seals the main filter chamber 12. When the lid 38 is removed or otherwise opened, access can be gained to the interior of the main filter chamber 12 to permit of removal and replacement of the filter 14 through the upper end of the main filter chamber 12, when the filter 14 is clogged and/or saturated with oily contaminant. To facilitate this operation, the filter 14 is provided in the example, at the upper end thereof, with a handle 13. In another example the filter 14 could be a floating filter which descends as more and more oily contaminant is adsorbed.

In another example of the FIGS. 1 to 3 embodiments, a secondary filter chamber 20 may not be provided, or at least such a secondary filter chamber 20 with a Carbon filter 21 need not be provided, but some other means of further filtrate treatment may be provided for, within or externally of the filtering machine 10, to enable the filtrate from the main chamber 12 to be cleansed to such an extent that it may be released to the environment, as required.

Where a secondary filter 21 is provided, this need not be an activated Carbon filter, but the secondary filter 21 may be provided by a further filter similar to the first filter 14 i.e. in which the filter material includes particles 29 of agglomerated oleophillic fibres, or a mixtures of such particles, (which may or may not be coated or otherwise together with particles of oleophillic adsorbent material) and activated Carbon particles, or any other oleophillic adsorbent material which can provide final filtering.

In another example, the main filter chamber 12 need not be cylindrical but may be of another configuration. In this case the filter 14 may need to be correspondingly configured.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A filtering machine for filtering a mixture which includes entrained oily contaminant, the filtering machine comprising a filter which has an exterior housing through which the mixture, in use, passes to contact filter material within an interior of the exterior housing, and through which filtrate passes out of the filter, wherein the filter material includes particles of agglomerated oleophillic fibres, wherein the oleophillic fibres from which the particles are agglomerated have a diameter of less than 10 µm and a length of less than 20 mm.

2. The machine according to claim 1 wherein the particles of agglomerated oleophillic fibres are silica-based fibres.

3. The machine according to claim 2 wherein the silica-based fibres of the particles of agglomerated oleophillic fibres are glass fibres.

4. The machine according to claim 3 wherein the glass fibres are in the form of glass wool.

5. The machine according to claim 1 wherein the fibres have a diameter of less than 8 µm.

6. The machine according to claim 1 wherein the fibres have a diameter in the range of 5.0 µm to 5.5 µm.

7. The machine according to claim 1 wherein the particles of agglomerated glass fibres are packed in the exterior housing to a density of between 50 grams per liter and 400 grams per liter.

8. The machine according to claim 7 wherein the particles are packed to a density of between 80 grams per liter and 200 grams per liter.

9. The machine according to claim 1 wherein the particles of agglomerated oleophillic fibres have a maximum external dimension in the range of 1 mm to 20 mm.

10. The machine according to claim 9 wherein the particles of agglomerated oleophillic fibres have a maximum external dimension in the range of 1 mm to 7 mm.

11. The machine according to claim 1 wherein the filter material includes an oleophillic adsorbent.

12. The machine according to claim 11 wherein the oleophillic adsorbent is in powder form, and at least partially coats at least some of the particles of agglomerated oleophillic fibres.

13. The machine according to claim 12 wherein the powder particles of the oleophillic adsorbent are able to pass through a sieve of mesh size 200.

14. The machine according to claim 12 wherein the particles of agglomerated oleophillic fibres are at least partially coated with an adhesive agent to promote adhesion of the oleophillic adsorbent powder thereto.

15. The machine according to claim 11 wherein the oleophillic adsorbent includes at least one of clay, Bentonite clay, Organoclay, and activated Carbon.

16. The machine according to claim 11 wherein the exterior housing has openings which permit the mixture and filtrate to flow to and from the interior of the filter which are provided by the construction of the exterior housing, wherein the openings are smaller than the particles of oleophillic adsorbent.

17. The machine according to claim 1 wherein the filter includes particles of an anti-packing material which assist in maintaining flow paths for the mixture being filtered.

18. The machine according to claim 1 wherein the particles of agglomerated oleophillic fibres are treated with a wetting agent.

19. The machine according to claim 1 wherein the exterior housing of the filter is provided at least in part by a flexible material.

20. The machine according to claim 19 wherein the machine further comprises a main filter chamber in which the filter is located, there being an inlet to main filter the chamber for the mixture, and an outlet from the main filter chamber for filtrate, the mixture passing in use, from the inlet to main filter the chamber, through the exterior housing wall of the filter into the interior of the filter, and filtrate passing back through the exterior housing wall of the filter to the main filter chamber outlet.

21. The machine according to claim 20 wherein the exterior housing has openings which permit the mixture and filtrate to flow to and from the interior of the filter which are provided by the construction of the exterior housing.

22. The machine according to claim 21 wherein the exterior housing is made of a material which has openings formed by perforating the material.

23. The machine according to claim 20 wherein the filter includes an external seal which seals with an interior wall of the main chamber, so that mixture which passes into the main filter chamber through the inlet is constrained to pass into the filter interior before being able to pass to the main filter chamber outlet.

24. The machine according to claim 20 wherein the main filter chamber includes at or towards an upper end thereof, a removable lid, which when closed with the remainder of the main filter chamber, seals or substantially seals the main filter chamber, and when opened permits removal and replacement of the filter from the main filter chamber.

25. The machine according to claim 20 wherein the filtering machine includes a secondary filter chamber which receives filtrate from the main filter chamber, the secondary filter chamber including a further filter.

26. The machine according to claim 1 wherein the filter is in use, at least partially immersed in at least one of the mixture and the filtrate.

27. A method of filtering using the filtering machine of claim 1, the method including passing the mixture to be filtered into the filter interior, and contacting the mixture with the filter material in the interior of the filter, and passing the filtrate out of the filter.

28. The method of filtering according to claim 27 further comprising treating the filter material prior to filtering with a wetting agent.

29. The method according to claim 27 wherein the mixture is condensate from one or more air compressors.

30. A method of making a filter which includes an exterior housing through which a mixture which includes entrained oily contaminant, in use, passes to contact filter material within an interior of the exterior housing, and through which filtrate passes out of the filter, the method comprising making the filter material by introducing oleophillic fibres into an agglomerating device which agitates the oleophillic fibres and forms the oleophillic fibres into particles of agglomerated oleophillic fibres, wherein the oleophillic fibres from which the particles are agglomerated have a diameter of less than 10 µm and a length of less than 20 mm, and introducing the particles of agglomerated oleophillic fibres into the filter housing.

31. The method according to claim 30 further comprising introducing into the agglomerating device, powder particles of an oleophillic adsorbent at least to partially coat at least some of the particles of agglomerated oleophillic fibres.

32. The method according to claim 31 wherein the particles of oleophillic adsorbent include at least one of clay, Bentonite clay, Organoclay, and activated Carbon.

33. The method according to claim 31 further comprising at least partially coating the particles of agglomerated oleophillic fibres with an adhesive agent to promote the adhesion of the powder particles.

34. The method according to claim 30 wherein the method includes prior to use, treating the particles of agglomerated oleophillic fibres with a wetting agent.

* * * * *